United States Patent [19]

Izumi et al.

[11] Patent Number: 4,846,499
[45] Date of Patent: Jul. 11, 1989

[54] DEVICES FOR SUPPORTING AN LPG TANK BRACKET OF AN LPG FORK LIFT

[75] Inventors: Akira Izumi; Ichiro Nagasaka, both of Kariya, Japan

[73] Assignee: Kabushiki Kaisha Toyoda Jidoshokki Seisakusho, Kariya, Japan

[21] Appl. No.: 262,203

[22] Filed: Oct. 19, 1988

Related U.S. Application Data

[63] Continuation of Ser. No. 76,377, Jul. 22, 1987, abandoned.

[30] Foreign Application Priority Data

Jul. 25, 1986 [JP] Japan .......................... 61-113386[U]

[51] Int. Cl.⁴ ............................................ B60R 11/00
[52] U.S. Cl. .................................. 280/830; 280/760; 280/769; 180/69.4; 248/218.4
[58] Field of Search ................. 248/218.4, 219.4, 210, 248/231, 230; 280/769, 760, 830, 834; 180/69.4

[56] References Cited

U.S. PATENT DOCUMENTS

| | | | |
|---|---|---|---|
| 901,284 | 10/1908 | Edmunds | 248/230 |
| 1,509,022 | 9/1924 | Noble | 248/230 X |
| 1,893,702 | 1/1933 | Glenn | 248/231.5 |
| 2,447,228 | 8/1948 | Boston | 248/219.1 |
| 3,561,712 | 2/1971 | Newsome | 248/230 X |

Primary Examiner—Charles A. Marmor
Assistant Examiner—Anne M. Boehler
Attorney, Agent, or Firm—Brooks Haidt Haffner & Delahunty

[57] ABSTRACT

Devices for supporting an LPG tank bracket between overhead guard rear pillars of an LPG fork lift. Each supporting device comprises a mounting member which is removably mounted around the rear pillar and a member for supporting one end of the tank bracket, the supporting member being welded on the mounting member. Therefore, the LPG tank bracket can be supported between the pillars, even if the rear pillars are not specially designed for an LPG fork lift.

8 Claims, 3 Drawing Sheets

DEVICES FOR SUPPORTING AN LPG TANK BRACKET OF AN LPG FORK LIFT

This application is a continuation, of application Ser. No. 076,377, filed July 22, 1987 now abandoned.

BACKGROUND OF THE INVENTION

This invention relates to a fork lift using LPG (liquefied petroleum gas) as a fuel, and more particularly to devices for supporting an LPG tank bracket on which an LPG tank is carried.

In FIGS. 1 and 2, a typical prior art LPG fork lift has left and right rear pillars 10 and 12 of an overhead guard 14, on the rear surfaces of which members 16 and 18 for supporting an LPG tank bracket 20 are welded respectively. Generally, the supporting member 16 can support one end of the bracket 20 so that it can swing horizontally, while the member 18 can receive a projection 22 on the other end of the bracket 20 and removably secure it with a bolt 24. Therefore, for example, when exchanging the LPG tank 26 (shown in FIG. 1), the removal of the bolt 24 allows the LPG tank bracket 20 to be swung to one side of the fork-life body, simplifying the exchange of the LPG tank.

However, the above described conventional LPG fork lift truck has a problem in that its manufacture requires much labor because the LPG fork lift truck needs the rear pillars in order to have the bracket supporting members welded thereon.

SUMMARY OF THE INVENTION

It is therefore a principal object of this invention to eliminate the aforementioned problem of the prior art.

The above and other objects of this invention are achieved by devices for supporting an LPG tank bracket between left and right overhead guard rear pillars of an LPG fork lift truck, each of the devices comprising a mounting member and a member for supporting one end of the LPG tank bracket. Each mounting member includes two steel plates and can be removably mounted around each of the rear pillars by closing and tightening the steel plates with a fastening means, such as a bolt or a hook, the supporting member being fixed on one of the plates.

BRIEF DESCRIPTION OF THE DRAWINGS

The above and other advantages of this invention will become more apparent in the following description and the accompanying drawings in which like numerals refer to like parts and in which.

EMBODIMENT OF THE INVENTION

Figure 1:
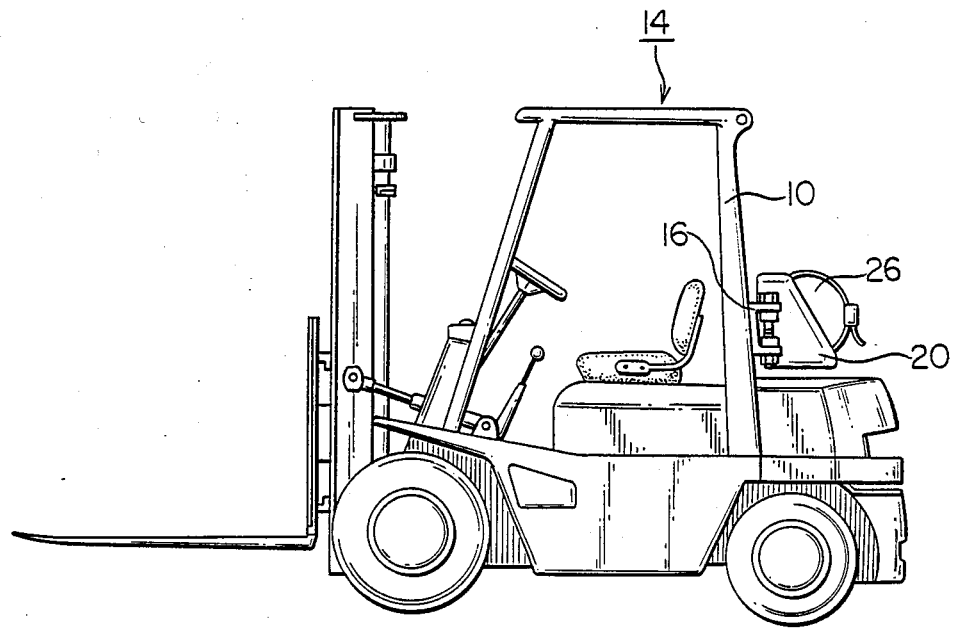
FIG. 1 is a side elevational view of a prior art LPG fork lift.
Figure 2:
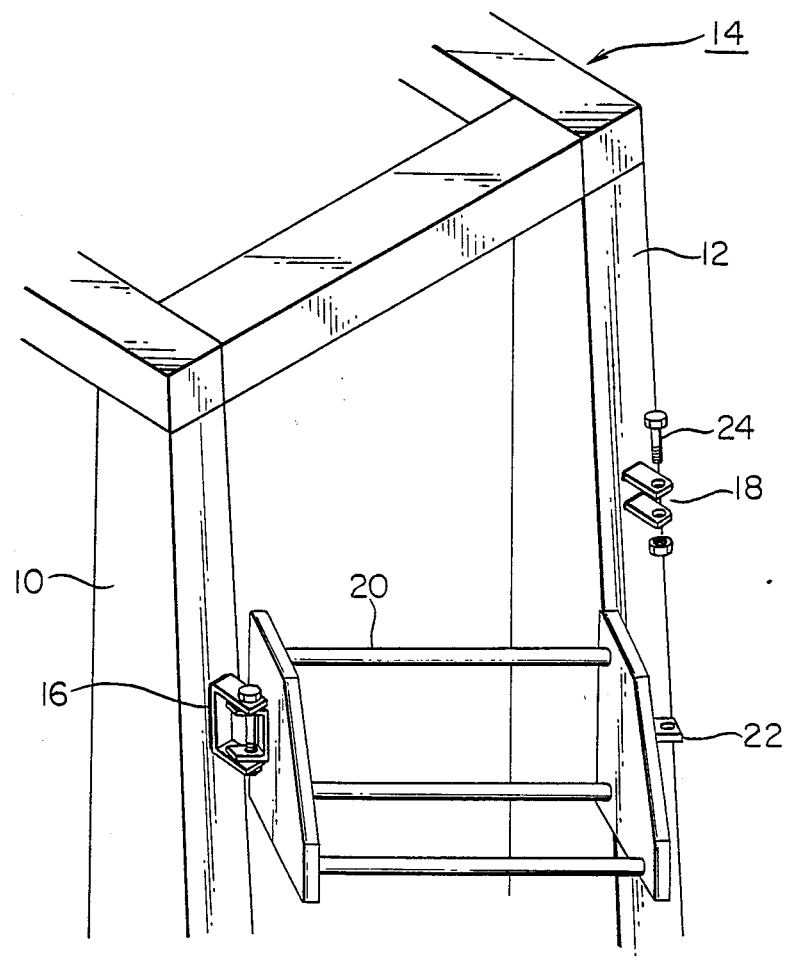
FIG. 2 is a schematic view showing the supporting condition of an LPG tank bracket in FIG. 1.
Figure 3:
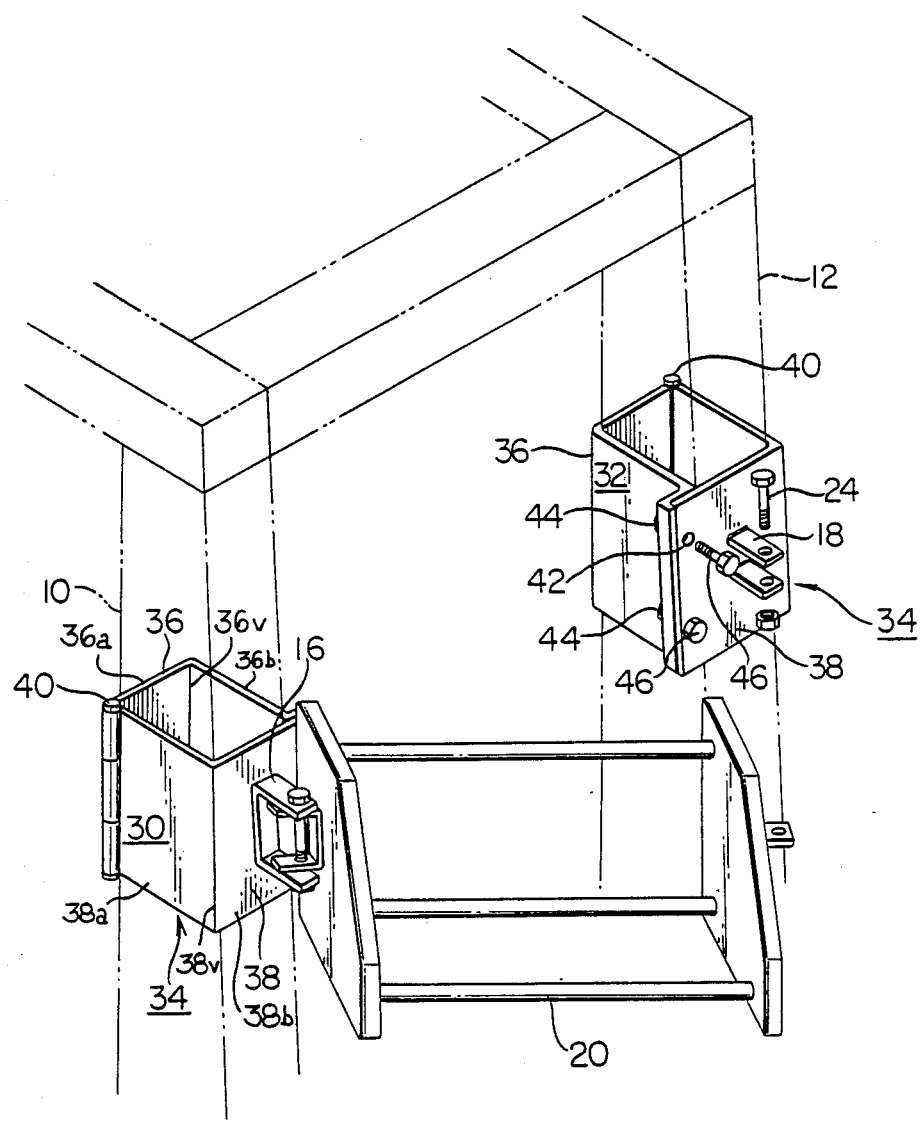
FIG. 3 is a schematic view of a device for supporting an LPG tank bracket of an LPG fork lift truck in accordance with this invention.

Referring to FIG. 3, devices 30 and 32 for supporting an LPG tank bracket 20 in accordance with this invention are respectively mounted on overhead guard rear pillars 10 and 12 on the left and right sides of an LPG fork lift. The pillars are of substantially rectilinear cross-section. Each of the supporting devices comprises a member 16 or 18 for supporting either end of the LPG tank bracket 20, and a mounting member 34 which can be surroundingly mounted at suitable positions around each of the rear pillars 10 or 12, with the supporting member 16 or 18 being welded on the mounting member.

The mounting member 34 includes two generally L-shaped steel plates 36 and 38 each having a first portion (36a, 38a) and a second portion (36b, 38b) extending from a vertex (36v, 38v) to respective first and second edges. The plates are hinged together by a pin 40, and these plates are designed to surroundingly mount around the rear pillar 10 or 12 by closing these plates. The opposite free edges of the steel plates 36 and 38 are suitably bent to abut each other. On the contact portions of these plates, bolt holes 42 are provided, and nuts 44 are welded on the non-contact surface of the plate 36 coaxially with the bolt holes 42 respectively.

Such a mounting member 34 can be wound around the rear pillar 10 or 12 by opening the two steel plates 36 and 38 and then being mounted on the rear pillar by merely passing bolts 46 through the bolt holes 42 and tightening them after closing the plates 36 and 38 to form a frusto-pyramidal structure. It is noted that since the rear pillar 10 or 12 generally expands downwardly, the mounting member 34 won't slip down from a given position if just the bolts 46 are tightened.

When the mounting members 34 of the supporting devices 30 and 32 are mounted on the rear pillars 10 and 12 respectively, the LPG tank bracket 20 is supported between supporting members 16 and 18 which are welded on the steel plate 38 located on the rear side of rear pillar 10 or 12 in the same way as the prior art. In other words, one end of the bracket 20 is swingably supported on the supporting member 16, and the other end is removably locked on the other member 18 with a bolt 24.

In the above described embodiment, the steel plates 36 and 38 are permanently hinged by the pin 40. However, it will be apparent that these plates may be joined by a bolt in this hinge portion, and consequently they can be separated. Thus, it should be understood that it is intended that the appended claims cover all modifications falling within the true spirit and scope of this invention.

As mentioned above, according to this invention, there is no need to make special rear pillars for an LPG fork lift as in the prior art, and an LPG tank bracket can be easily mounted on the rear pillars of a common fork lift. Therefore, it becomes possible to easily remodel a gasoline fork lift truck into an LPG fork lift truck.

What we claim is:

1. Apparatus for supporting an LPG tank bracket horizontally between left and right rear pillars of an overhead guard of an LPG fork lift vehicle where said pillars are tapered from a broader lower end to a narrower upper end, said apparatus comprising: a pair of mounting members each having two steel plates complementally shaped and sized relative to a predetermined portion at a given position intermediate the ends of a corresponding one of said pillars and constructed for removable embracing installation encircling the respective pillar about said predetermined portion, means for separably fastening together in a continuous gripping encirclement the two plates of a respective mounting member about a corresponding pillar at the location of said predetermined portion with said plates upon assembly forming an embracing collar with a frusto-pyramidal interior, one plate of each pair being constructed for pillar installation with at least a portion of said one plate facing rearwardly of said vehicle which portion is provided with externally projecting mounting means for attachment to respective ends of said tank bracket.

2. Apparatus according to claim 1, wherein each of said plates is generally L-shaped for encircling a pillar of substantially rectilinear cross-section, each L-shaped plate having first and second portions extending from a vertex to respective first and second edges, the two plates of each mounting member being hinged together along said first edges such that a substantially rectilinear frusto-pyramidal tubular structure is formed when said second edges of said two plates are brought into proximity.

3. Apparatus according to claim 2, wherein said means for fastening together the two plates comprises at least one threaded bolt for securing together said second portions at said second edges.

4. Apparatus according to claim 1, wherein said means for fastening together the two plates comprises at least one threaded bolt.

5. Apparatus according to claim 1, wherein said externally projecting mounting means comprise on one of said plates swivel means for swingably supporting one end of said tank bracket, and on the other of said plates, means for connecting separably to the other end of said tank bracket.

6. Apparatus according to claim 2, wherein said externally projecting mounting means comprise on one of said plates swivel means for swingably supporting one end of said tank bracket, and on the other of said plates, means for connecting separably to the other end of said tank bracket.

7. Apparatus according to claim 6, wherein said means for fastening together the two plates comprises at least one threaded bolt for securing together said second portions at said second edges.

8. Apparatus according to claim 4, wherein said externally projecting mounting means comprise on one of said plates swivel means for swingably supporting one end of said tank bracket, and on the other of said plates, means for connecting separably to the other end of said tank bracket.

* * * * *